(12) United States Patent
Lötgering et al.

(10) Patent No.: US 12,548,120 B2
(45) Date of Patent: Feb. 10, 2026

(54) HYBRID DIFFERENTIAL DEFOCUS PHASE CONTRAST

(71) Applicant: Carl Zeiss Microscopy GmbH, Jena (DE)

(72) Inventors: Lars Lötgering, Jena (DE); Lars Stoppe, Jena (DE); Markus Sticker, Jena (DE)

(73) Assignee: Carl Zeiss Microscopy GmbH, Jena (DE)

( * ) Notice: Subject to any disclaimer, the term of this patent is extended or adjusted under 35 U.S.C. 154(b) by 0 days.

(21) Appl. No.: 18/766,847

(22) Filed: Jul. 9, 2024

(65) Prior Publication Data

US 2025/0029211 A1    Jan. 23, 2025

(30) Foreign Application Priority Data

Jul. 12, 2023 (EP) .................... 23185071

(51) Int. Cl.
| | |
|---|---|
| G06T 5/50 | (2006.01) |
| G02B 21/14 | (2006.01) |
| G02B 21/36 | (2006.01) |
| G06T 7/00 | (2017.01) |

(52) U.S. Cl.
CPC ............ *G06T 5/50* (2013.01); *G02B 21/14* (2013.01); *G02B 21/367* (2013.01); *G06T 7/0002* (2013.01); *G06T 2207/10056* (2013.01); *G06T 2207/10148* (2013.01); *G06T 2207/20212* (2013.01)

(58) Field of Classification Search
CPC ............ G06T 5/50; G06T 7/0002; G06T 2207/10056; G06T 2207/10148; G06T 2207/20212; G06T 5/10; G06T 5/20; G06T 7/97; G06T 2207/20024; G06T 2207/20056; G06T 2207/20221; G06T 2207/20224; G02B 21/14; G02B 21/367; G02B 21/0052; G02B 21/06; G02B 21/362
See application file for complete search history.

(56) References Cited

U.S. PATENT DOCUMENTS

| | | | | |
|---|---|---|---|---|
| 2012/0044340 | A1* | 2/2012 | Yamamoto | G02B 21/14 348/79 |
| 2020/0209604 | A1* | 7/2020 | Chen | G02B 21/14 |
| 2022/0011563 | A1* | 1/2022 | Zuo | G02B 21/367 |

(Continued)

FOREIGN PATENT DOCUMENTS

| | | |
|---|---|---|
| CN | 107966801 A | 4/2018 |
| DE | 10 2019 100 419.5 A1 | 7/2020 |

(Continued)

OTHER PUBLICATIONS

European Search Report and Opinion for European Patent Application No. 23185071.0 dated Dec. 18, 2023.

(Continued)

*Primary Examiner* — Sath V Perungavoor
*Assistant Examiner* — Tyler B Edwards
(74) *Attorney, Agent, or Firm* — Sage Patent Group

(57) ABSTRACT

Phase contrast images are calculated by digitally post-processing microscope images acquired at different angled illumination configurations and defocus values.

20 Claims, 5 Drawing Sheets

(56) References Cited

U.S. PATENT DOCUMENTS

2022/0366552 A1* 11/2022 Chen .................. G06T 5/50

FOREIGN PATENT DOCUMENTS

| JP | 2017-526964 A | 9/2017 |
| JP | 2018-504627 A | 2/2018 |

OTHER PUBLICATIONS

Zhou Shun et al., "Transport-of-intensity Fourier ptychographic diffraction tomography: defying the matched illumination condition," Optica, vol. 9, No. 12, (Dec. 2022): pp. 1362-1373.

Zuo Chao et al., "Transport of intensity equation: a tutorial", Optics and Lasers in Engineering, vol. 135, (Jun. 2020), Elsevier, Amsterdam, NL, 101 pages.

Micah H. Jenkins et al., "Quantitative phase microscopy via optimized inversion of the phase optical transfer function," Applied Optics, vol. 54, No. 28 (Oct. 1, 2015): pp. 8566-8579.

Zernike, Frits, "Phase Contrast, A New Method for the Microscopic Observation of Transparent Object," Physica 9.10 (1942): pp. 974-986.

Gabor, Dennis, "Microscopy by reconstructed wave-fronts," Proceedings of the Royal Society of London. Series A. Mathematical and Physical Sciences 197.1051 (1949): pp. 454-487.

Nomarski, Georges. "Microinterféromètre différentiel à ondes polarisées." J. Phys. Rad. 16 (1955): 9S-13S. (Lang, Walter, "Nomarski differential interference-contrast microscopy," 8 pages).

Streibl, Norbert, "Phase imaging by the transport equation of intensity," Optics Communications vol. 49, No. 1 (1984): pp. 6-10.

Mehta, Shalin B. and Sheppard, Colin JR, "Quantitative phase-gradient imaging at high resolution with asymmetric illumination-based differential phase contrast," Optics Letters, vol. 34, No. 13 (Jul. 1, 2009): pp. 1924-1926.

Tian, Lei and Waller, Laura, "Quantitative differential phase contrast imaging in an LED array microscope," Optics Express vol. 23, No. 9 (2015): pp. 11394-11403.

Office Action for Japanese Patent Application No. 2024-101059 dated Jun. 10, 2025, 6 pages.

Decision to Grant for Japanese Patent Application No. 2024-101059 dated Nov. 4, 2025, 3 pages.

* cited by examiner

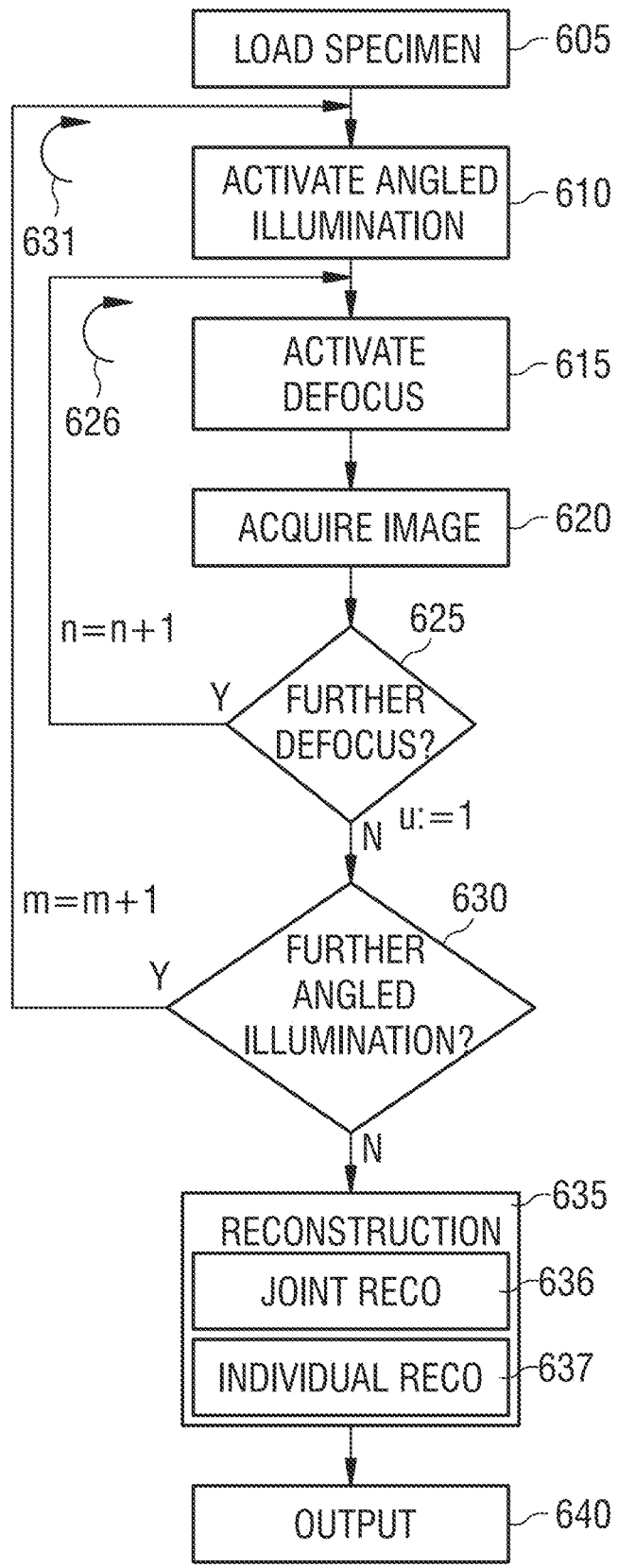

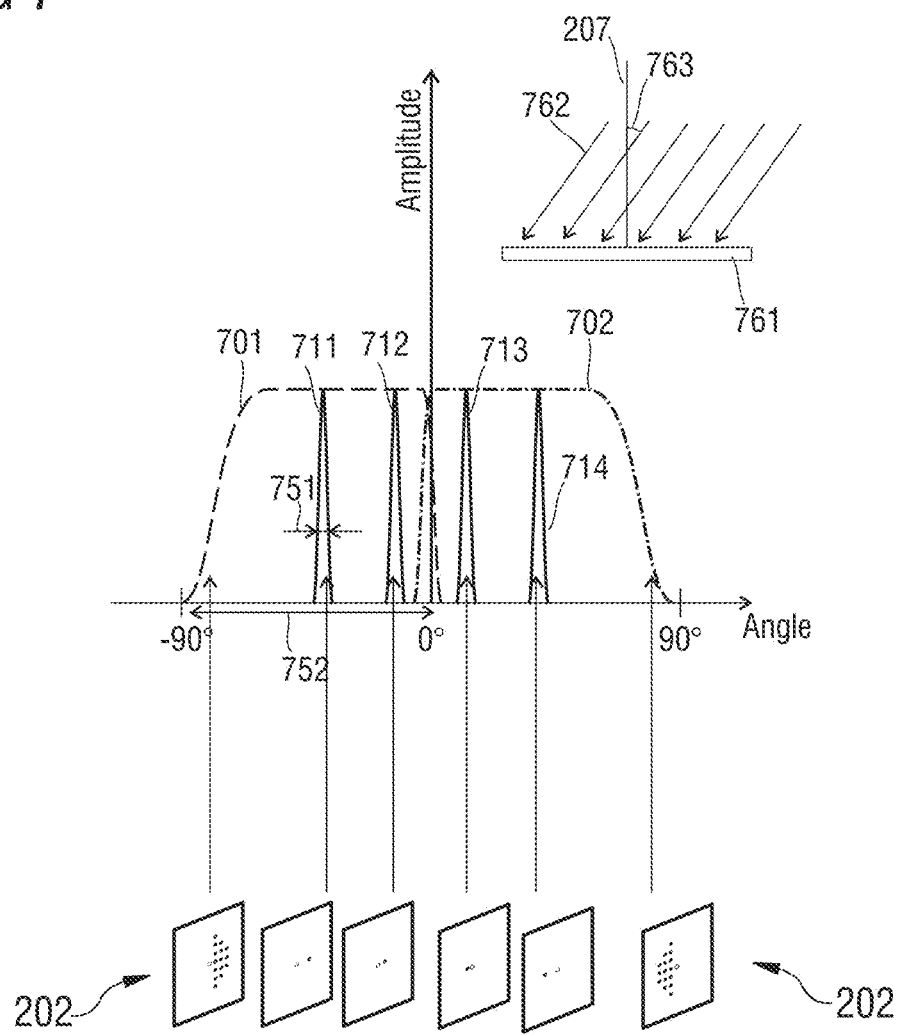

HYBRID DIFFERENTIAL DEFOCUS PHASE CONTRAST

PRIORITY

The subject application claims priority of European patent application 23 185 071.0, filed Jul. 12, 2023; this European patent application is incorporated herein by reference.

TECHNICAL FIELD

Various examples of the disclosure generally pertain to digital phase contrast techniques for determining a phase contrast image by digitally postprocessing multiple microscope images. In particular, techniques are disclosed that enhance the cumulative phase transfer function based on use of multiple angled illumination configurations and multiple defocus values.

BACKGROUND

When light interacts with a specimen of interest, such as biological tissue, two primary contrast mechanisms leave a footprint on the incident radiation. First, the specimen can attenuate the incident light due to absorption. Second, the specimen can deform an incident optical wavefront, thereby imprinting phase contrast. For thin and unlabeled biological specimens, the absorption is typically negligible. In such circumstances phase contrast microscopes are used to produce an image of the specimen.

The history of phase-sensitive techniques is long, including Zernike phase contrast microscopy [1], Gabor inline holography [2], and Nomarski differential interference contrast (DIC) microscopy [3], to list a few examples. While phase-sensitive, the above methods are typically not quantitative and lead to artefacts in the final image that do not originate from the specimen itself. For example, halo artifacts observed at phase discontinuities in Zernike's phase contrast microscopy can prevent direct phase quantification. Gabor inline holography suffers from the so-called twin-image artefact, while Nomarski DIC requires additional hardware components such as phase shifting elements or polarization optics. The latter problems pose hurdles to the microscope user in terms of cost, complexity, and calibration challenges.

More recently, quantitative phase imaging systems underwent a shift towards data-driven approaches: here typically multiple images are recorded which are then numerically combined into a single phase contrast image using first principles of physical image formation. Thus, such techniques may be referred to as digital phase contrast: the phase contrast is obtained from digital post-processing of the acquired intensity images. Prominent examples are the transport of intensity equation (TIE) [4] and differential phase contrast (DPC) [5]. To acquire a TIE data set, the specimen is translated along the optical axis (z-direction) and a so-called z-stack consisting of at least two images is recorded. The data is then numerically converted into a phase contrast image by solving a diffusion-type partial differential equation. For instance, US 2020/209604 A1 discloses a ring-shaped illumination in combination with TIE—i.e., acquisition of images at non-zero defocus values—and a rigorous phase transfer function (PTF) computation. In DPC, the specimen is illuminated from at least three different directions (angled illumination), while the specimen remains at a fixed z-position. Possible sources of angled illumination are any type of segmented source; examples are segmented diodes [5], light emitting diode (LED) arrays [6], digital micromirror devices (DMDs), liquid crystal displays (LCDs), or variable condenser aperture stops. The recorded data is subsequently converted into a phase contrast image by solving a deconvolution problem.

TIE and DPC have fundamental shortcomings: (1) TIE typically employs a point source illumination. A source of radiation laterally extended with respect to the optical axis would be desirable to improve the achievable lateral resolution of the optical system. (2) DPC performs poorly when the illumination and detection numerical aperture (NA) are mismatched [6,7]. In particular, the latter is problematic, when the illumination NA is smaller than the detection NA. Under these circumstances, the resulting phase image lacks contrast.

A possible solution to problem (1) has recently been reported by Zuo and coworkers [7]. In this work, the specimen was sequentially illuminated by individual LEDs, while the specimen was also defocused. Unfortunately, sequentially using each LED in a large LED matrix combined with defocus required hundreds of images that needed to be captured, rendering the technique slow and computationally complex in terms of data that need to be recorded, transferred, processed, and stored.

A possible solution to problem (2) is to combine DPC with a modified objective, as for example described in PCT/EP2020/050307, [8]. In the latter patent, the authors used an amplitude modulating pupil ring in combination with a DPC acquisition scheme. Unfortunately, the latter has the shortcoming that some of the light entering the pupil is absorbed—an undesirable effect for fluorescence imaging when combined with DPC without changing the objective.

SUMMARY

Accordingly, a need exists for advanced techniques of digital phase contrast microscopy. A need exists for techniques that mitigate at least some of the above-identified restrictions or drawbacks.

This need is met by the features of the independent claims. The features of the dependent claims define embodiments.

Hereinafter, digital phase contrast techniques are disclosed. Multiple microscope images are acquired at multiple settings, each setting being characterized by a respective defocus value as well as a respective angled illumination configuration. Various techniques are based on the finding that, both, defocus of the imaging plane as well as angled illumination of the imaging plane has the potential to obtain images that encode phase information. By combining, both, angled illumination and defocus, phase information can be reconstructed at a larger range of spatial frequencies if compared to reference techniques such as TIE or DPC. Thus, phase-contrast images of good quality can be obtained.

A method of determining a phase contrast image is disclosed. The phase contrast image is determined based on multiple microscope images that are acquired using a microscope.

The multiple microscope images are intensity images. I.e., they are not acquired with phase contrast. Nonetheless, information is encoded in the microscope images that enables to reconstruct a phase of a specimen that is imaged.

The microscope includes an illumination module. The illumination module is configured for providing a switchable angled illumination. I.e., different angled illumination configurations can be activated. The angled illumination provides a certain range of angles under which light is incident in an imaging plane of the microscope. This angular spectrum of the angled illumination is fixed across the imaging plane.

The microscope further includes an optical system. The optical system includes one or more optical elements, e.g., lenses. The optical system is configured to illuminate the imaging plane. Also, the optical system is configured to image the imaging plane onto at least one camera of the microscope.

The method includes controlling the illumination module to activate multiple angled illumination configurations. In at least some examples, at least one of the multiple angled illumination configurations includes a range of illumination directions. I.e., each of the at least one angled illumination configuration comprises a respective extended angular spectrum (rather than only a single illumination angle).

It is possible that only a single one of the multiple angled illumination configurations includes a range of illumination directions. It is also possible that each of the multiple angled illumination configurations includes a range of illumination directions. When not all of the multiple angled illumination configurations include a range of illumination directions, the remaining angled illumination configurations include a single illumination direction. The multiple angled illumination configurations can have respective angular spectra that have varying widths. For instance, a first angled illumination configuration has a first angular spectrum that has a first width while a second angled illumination configuration has a second angular spectrum that has a different, second width. A broader angular spectrum can be used together with a narrower angular spectrum. The narrower angular spectrum can have a minimum achievable width for the respective illumination module (i.e., a single illumination direction).

For example, each of the multiple angled illumination configurations (indexed by j) may be associated with a respective illumination numerical aperture (NA), $NA_{i,j}$. The illumination NA defines the range of angles with which the object plane is illuminated. Increasing $NA_i$ typically increases the coherence of the illumination, as a higher $NA_i$ condenses the range of angles over which the light is emitted, effectively narrowing the light source and increasing its spatial coherence.

The detector optics, e.g., an objective lens or objective lens system, defines a detection NA, $NA_d$. The detector NA is defined by the objective lens or lens system. The detector NA impacts how finely detail can be resolved in the image; a higher detector NA allows for the collection of light from wider angles, increasing resolution.

It is possible that each illumination numerical aperture (associated with each of the multiple angled illumination configurations) is smaller than the detection numerical aperture, e.g., at least by a factor of 2: $\sigma = NA_{i,j}/NA_d$ with $\sigma \leq \frac{1}{2}$ for all j. $\sigma$ is sometimes referred to as coherence parameter. I.e., for any image that is acquired and post-processed, $\sigma$ may be 1% or less.

While above examples have been disclosed in which at least one of the multiple angled illumination configurations includes a range of illumination directions, this is generally optional. In some examples, each of the multiple angled illumination configurations includes a single respective illumination angle. "Single illumination angle" means that the width of the respective distribution of illumination angles is as small as possibly achievable using the illumination module. Typically, this may mean that a single light source, e.g., a single LED of a respective array is switched on.

The method also includes controlling the at least one camera to acquire multiple images at the multiple angled illumination configurations, as well as at multiple defocus values.

The method also includes combining the multiple images to determine the phase contrast image. As a general rule, combining two or more images may include calculating pairwise differences. Combining two or more images may also include calculating a phasor, i.e., a complex-valued representation of the sum of the combined two or more images, wherein respective phase shifts are applied to each individual image.

It would be generally possible that each of the multiple images is combined with each further image. In some scenarios, it would be alternatively possible that multiple subsets of images are formed, each subset only including some of the images. Then, each image within a given subset is combined with any further image in that subset. Such approach may be, in particular, applicable if multiple phase reconstructions algorithms are used that operate on separate subsets.

The phase contrast image can have a quantitative phase contrast, i.e., contrast can quantitatively encode the phase shift imposed by the object.

While above a method has been disclosed in which the at least one camera and the illumination module are controlled to acquire the images, in other scenarios, the multiple images can be pre-acquired. In such a scenario, multiple images are previously acquired at multiple defocus values and at multiple angled illumination configurations can be loaded from a database or picture archive and then combined to determine a phase contrast image.

A computing device includes a processor and a memory. The memory stores program code. The processor is configured to load the program code and to execute the program code. The processor, upon executing the program code, performs a method as disclosed above.

A computer program or a computer readable storage medium includes program code. The program code can be loaded and executed by a processor. The processor, upon executing the program code, performs a method as disclosed above.

It is to be understood that the features mentioned above and those yet to be explained below may be used not only in the respective combinations indicated, but also in other combinations or in isolation without departing from the scope of the invention.

BRIEF DESCRIPTION OF THE DRAWINGS

FIG. 6 is a flowchart of a method according to various examples.

FIG. 7 schematically illustrates the angular spectra of multiple angled illumination configurations according to various examples.

DETAILED DESCRIPTION

Figure 1:
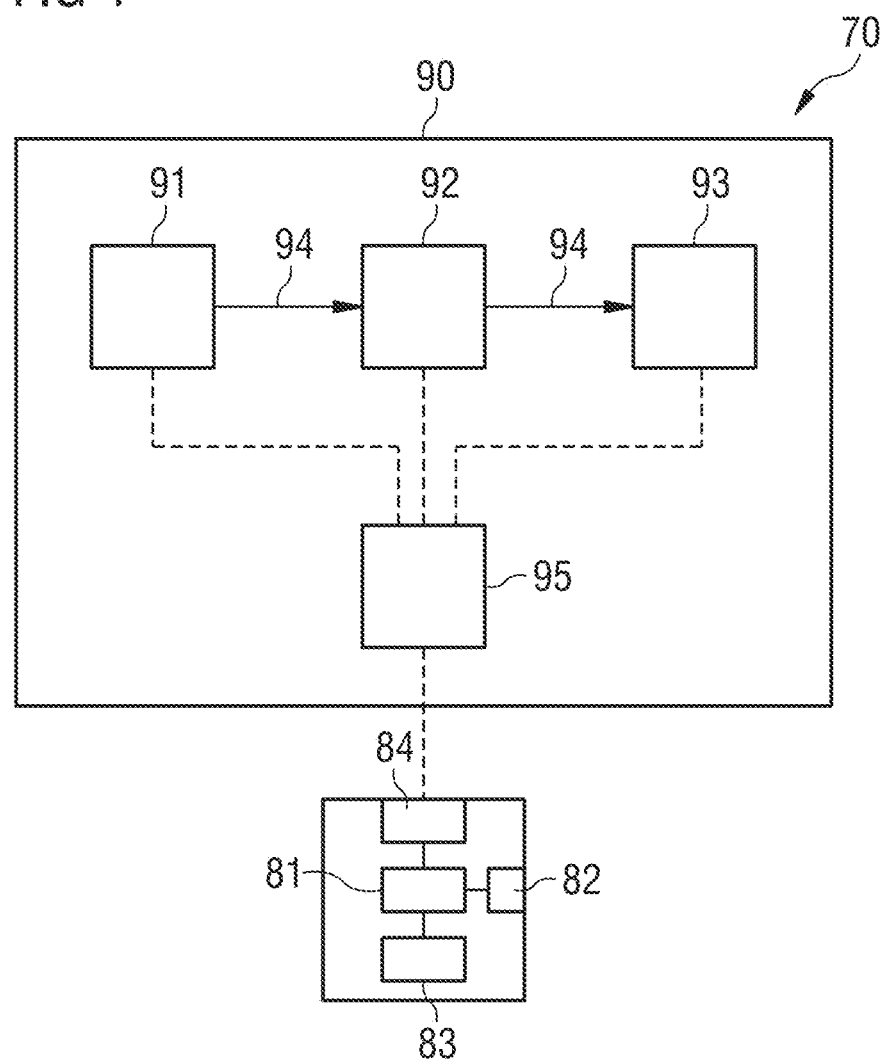
FIG. 1 schematically illustrates a system including a microscope and a computer according to various examples.

Some examples of the present disclosure generally provide for a plurality of circuits or other electrical devices. All references to the circuits and other electrical devices and the functionality provided by each are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microcontrollers, a graphics processor unit (GPU), integrated circuits, memory devices (e.g., FLASH, random access memory (RAM), read only memory (ROM), electrically programmable read only memory (EPROM), electrically erasable programmable read only memory (EEPROM), or other suitable variants thereof), and software which co-act with one another to perform operation(s) disclosed herein. In addition, any one or more of the electrical devices may be configured to execute a program code that is embodied in a non-transitory computer readable medium programmed to perform any number of the functions as disclosed.

In the following, embodiments of the invention will be described in detail with reference to the accompanying drawings. It is to be understood that the following description of embodiments is not to be taken in a limiting sense. The scope of the invention is not intended to be limited by the embodiments described hereinafter or by the drawings, which are taken to be illustrative only.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

The techniques disclosed herein may be termed "hybrid differential defocus (HDD) phase contrast". HDD phase contrast combines the benefits of TIE and DPC, while resolving each technique's shortcomings. In HDD, the specimen is defocused and illuminated by an asymmetric illumination pattern. Unlike reference [7], the disclosed techniques do not exclusively employ individual LED illuminations which result in a large number of image acquisitions. Instead, HDD utilizes, at least to some degree, illumination direction multiplexing, where, e.g., multiple facets (for example multiple LEDs) of a programmable light source are switched on at the same time. For instance, a half-pupil illumination can be used. I.e., a segmented light source is used which is switched on exactly in half in terms of area (e.g., upper half vs. lower half, or left half vs. right half). The segmentation is symmetrical to the optical axis. The pupil itself can be square, rectangular, elliptical, circular, or annular. More generally, multiple illumination configurations are activated, wherein at least one of the multiple illumination configurations comprises a range of illumination angles in the imaging plane.

In addition, HDD utilizes varying patterns displayed on the programmable light source, instead of TIE which uses exclusively a point source illumination. While in DPC the specimen is held at a fixed position in the focus plane, HDD utilizes axial specimen translation to achieve improved phase contrast. The imaging plane is, in the spatial domain, illuminated homogeneously using a certain angular spectrum (i.e., the angular spectrum does not depend on the lateral position relative to the optical axis within the relevant aperture), so the angled illumination configurations are not to be confused with, e.g., light-sheet microscopy where only a certain sheet of fraction of the sample is illuminated.

Various techniques are based on the finding that combining defocus with multiple angled illumination configurations results in a phase contrast modality that exhibits improved lateral resolution as compared to TIE, while not suffering from the unmatched NA problem leading to a low phase contrast as encountered in DPC.

Moreover, by multiplexing multiple LEDs in parallel, HDD results in orders of magnitude faster data acquisition protocols as compared to the state of the art [7].

FIG. 1 schematically illustrates a system 70 according to various examples. The system 70 includes a microscope 90 and a computer 80. The microscope 90 includes an illumination module 91, an optical system 92, and a detector module 93.

The detector module 93 includes a detector optics. The detector optics defines a detector numerical aperture $NA_d$. The detector module 93 further includes one or more cameras to acquire microscope images.

The illumination module 91 is configured to provide a switchable/re-configurable angled illumination of an imaging plane defined along the path of light 94 of the system 70. This means that the illumination angle can be controlled. Beyond controlling the main illumination angle, it would be optionally possible to also control the angular spectrum, e.g., the width or contributions, etc. For instance, it would be possible to activate multiple illumination configurations that have angular spectra of different width. Sometimes, only a single illumination direction may be activated (minimum width of the angular spectrum), sometimes multiple illumination directions may be superimposed (larger width of the angular spectrum).

The optical system 92 is configured to illuminate the imaging plane and further image the imaging plane onto the at least one camera of the detector module 93.

The microscope 90 also includes a control module 95 that is configured to control the various components of the microscope. For example, the control module 95 may be implemented using a CPU or a Field Programmable Gated Array (FPGA) or an Application Specific Integrated Circuit (ASIC). The control module 95 can include memory. The control module 95 can be configured to control the illumination module to activate multiple angled illumination configurations. The control module 95 can also be configured to control the detector module 93 and, specifically, the at least one camera of the detector module 93 to acquire multiple images. Optionally, the control module 95 can be configured to control the optical system 92, e.g., to move a sample holder configured to hold a specimen, thereby implementing multiple defocus values.

Also illustrated is the computer 80 that includes an interface 84 configured to communicate with the microscope 90, specifically the control module 95. For instance, a processor 81 of the computer 80—e.g., a CPU, an FPGA or an ASIC—can provide control data to the control module 95 to implement certain control functionality, e.g., trigger image acquisition, trigger activation of certain angled illumination configurations, trigger implementation of certain defocus values, etc. The processor 81 can also retrieve image data from the microscope 90 via the interface 84 and post processed the image data. It would also be possible that the processor 81 load image data from a database or picture archive.

The processor 81 is configured to load program code from a memory 83 and execute the program code to perform such techniques. In particular, digital postprocessing for determining a phase contrast image based on multiple intensity images retrieved from the microscope 90 can be executed by the processor 81. It is possible that the computer 80 also includes a user interface 82, e.g., a GUI, to output phase contrast images thus determined.

While in FIG. 1 a scenario is illustrated in which the computer architecture split in between the control module 95 and the computer 80, in some scenarios it would also be possible that digital postprocessing of image data is executed by the control module 95. Alternatively or additionally, component level control of the various components of the microscope 90 can also be a task at least partly delegated to the computer 80.

Figure 2:
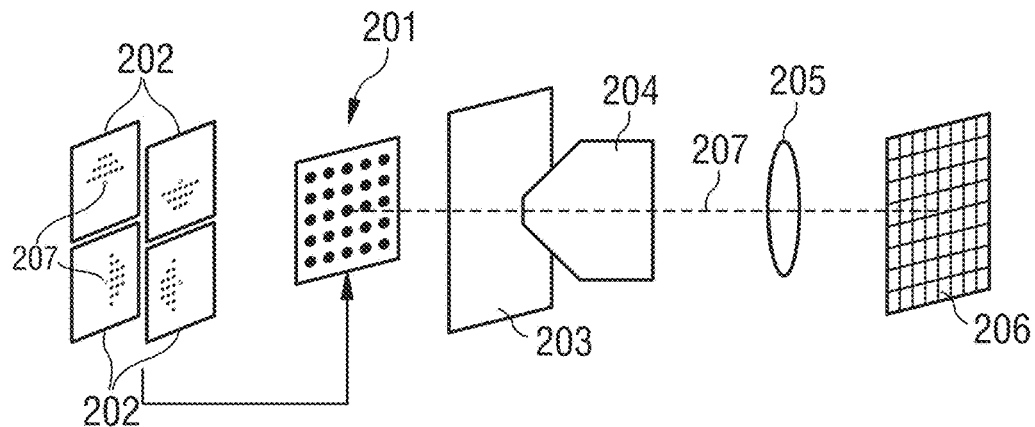
FIG. 2 schematically illustrates a DPC digital phase contrast technique according to prior art implementations.
Figure 3:
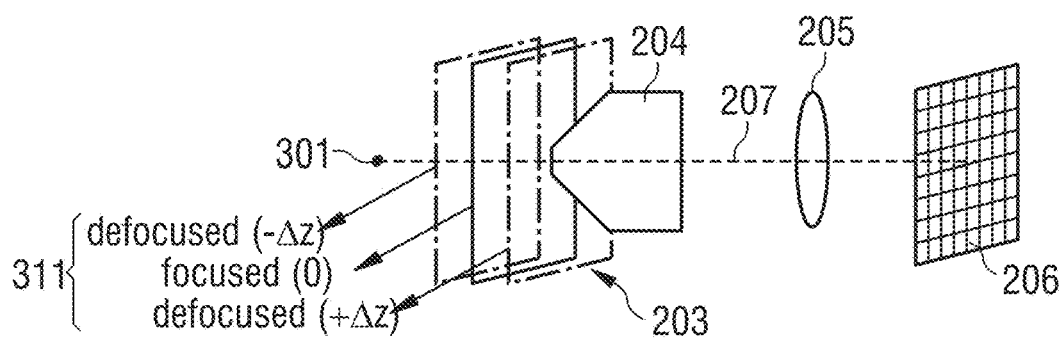
FIG. 3 schematically illustrates a TIE digital phase contrast technique according to prior art implementations.
Figure 4:
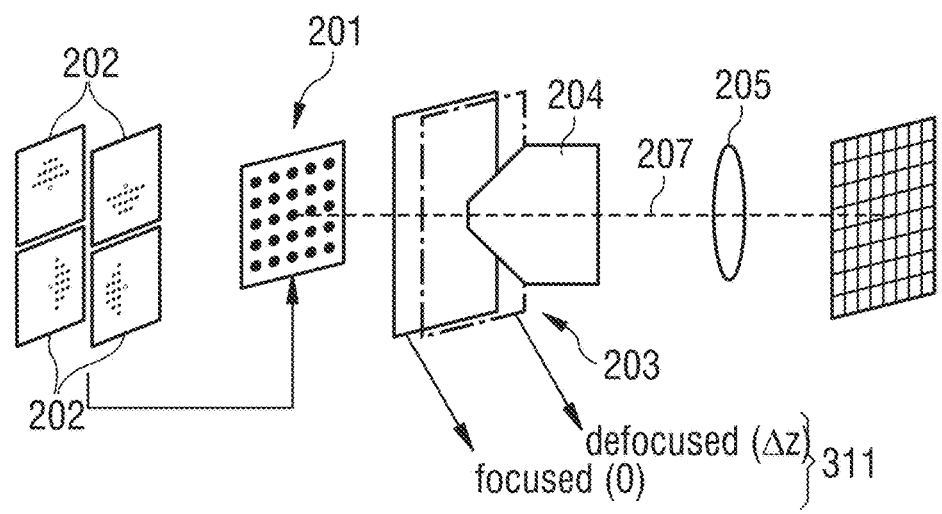
FIG. 4 schematically illustrates a phase contrast technique according to various examples.

FIG. 2, FIG. 3, and FIG. 4 illustrate the experimental hardware utilized in differential phase contrast (DPC), transport of intensity (TIE), and hybrid differential defocus (HDD) phase contrast imaging setups, respectively.

DPC (FIG. 2) uses a programmable illumination unit (PIU) 201. It requires an acquisition of at least three focal-plane images under varying illumination patterns 202 to produce a phase contrast image of a specimen. In particular, these variable illumination patterns 202 correspond to different angled illumination configurations for illuminating the imaging plane 203 at different angles while the specimen is kept in a fixed position. Each pattern 202 includes activated LEDs at different asymmetric distributions with respect to the optical axis 207 (dashed line and open circle). I.e., the respective illumination configuration includes multiple illumination directions (defined by the activated LEDs). An objective 204 and a tube lens 205 are used (part of the optical system, cf. FIG. 1: optical system 92) to image the imaging plane 203 onto a pixelated detector 206 (camera). Different LEDs are activated for the different variable illumination patterns 202. A subsequent numerical deconvolution routine converts the recorded images into a phase contrast image of the specimen, see [6]. Details with respect to such DPC phase reconstruction algorithm are explained next.

Assuming that a minimum of three images has been recorded from equi-spaced angular directions (azimuthal angles) separated by 120° (this angle denotes the azimuthal position of the average angular spectrum, e.g., using half-circle illumination patterns centered at that azimuthal angle). These images are all acquired at the same defocus value, i.e., in the present example nominally zero defocus so that the sample is in the imaging plane. These three images are included in a DPC subset. The two-dimensional (2D) raw images are referred to here by $I_0°$, $I_{120}°$, $I_{240}°$. These could be produced by, for example, three angularly equi-spaced LEDs with or without a diffuser to broaden the angular range. Alternatively, any angularly segmented source (digital micromirror device, spatial light modulator, etc.) could be used. Details with respect to the illumination module 91 have been disclosed above in connection with FIG. 1. Then, the complex-valued real-space phasor image is computed, as a combination of these three images in the DPC subset.

$$J = I_0 + I_{120} \cdot \exp\left(\frac{j2\pi}{3}\right) + I_{240} \cdot \exp\left(\frac{j4\pi}{3}\right). \quad \text{Equation 1}$$

The DPC phase contrast image is the computed using the formula of the phase reconstruction algorithm:

$$\phi_{DPC} = imag[iFFT(H_{DPC}^{-1} \cdot FFT(J))] \quad \text{Equation 2}$$

where $H_{DPC}(k) = \exp(j \cdot \arctan(k_y/k_x))$ is a Hilbert transform kernel (see Kieran G. Larkin and Peter A. Fletcher, "Isotropic scalar image visualization of vector differential image data using the inverse Riesz transform," Biomed. Opt. Express 5, 907-920 (2014); as well as Annex of this document) and imag[ . . . ] selects the imaginary part of a complex number. Instead of using the Hilbert transform kernel, it would also be possible to employ the DPC transfer function using the "weak object transfer function" (WOTF) formula: Equation 6. The computation of the Hilbert transform is an approximation, but faster—as the WOTF itself requires computation of at least two Fourier transforms. On the other hand, it has been observed that the reduction in accuracy is very limited for the relevant spatial frequencies.

The DPC phase contrast image suffers from artifacts that are induced by shadow casting from scatterers that are located outside of the imaging plane (out-of-focus scatterers). This shadow casting is sensitive to the direction of the angled illumination and thus is preserved in the real-space phase or image as calculated above. For instance, scatterers outside of the imaging plane can be scratches on optical elements in the optical path or dust on a backside of a specimen holder slide. Typically, these shadows casted into the DPC phase contrast image are not well localized, i.e., blurry and extended. I.e., they are limited to small spatial frequencies.

Now referring to FIG. 3: TIE phase reconstruction is based on a diffusion equation which relates an axial intensity derivative to the phase of the specimen. The axial intensity derivative can be approximated by recording at least two images, where the imaging plane and the specimen is shifted axially and close to the focal plane, thereby implementing multiple defocus values 311. The illumination unit is fully coherent, such as an on-axis point source 301 or an on-axis collimated laser. Also, partial coherent illumination may be used. After recording images under defocus variation (also known as z-stack), sufficient information is available to solve the underlying diffusion equation to yield the phase information of the specimen [4].

Two images are included in the TIE subset; these two images are acquired at two different defocus values, given by $I_{-\Delta z}$ and $I_{+\Delta z}$, where $\Delta z = c \cdot \lambda/NA^2$ is the distance to the focus plane of the specimen. Thus, a positive and a negative defocus value is used, equidistant to the focal plane. $\lambda$ and NA are the center wavelength of the illumination and the numerical aperture of the objective used. The c-parameter, accordingly, describes the magnitude of the defocus in relation to the depth of field of the detector optics. In practice, the c-parameter (for the images in the TIE subset) is chosen to be between $c=1$ and $c=10$ to control the defocus distance. The two images for the TIE subset are acquired at the same illumination configuration, e.g., an on-axis illumination. In such on-axis illumination, the angular spectrum is centered at the zenith and is partially coherent. This may be achieved by activating only a single light source that is centered on the optical axis for an array of light sources, as shown in FIG. 3 for the light source 301 centered on the optical axis 201. It would, however, also be possible to use a range of illumination directions. For example, for images postprocessed using TIE reconstruction, $$\frac{1}{10} \le \sigma \le \frac{1}{3}.$$

or specifically $$\sigma \le \frac{1}{3}$$

The TIE phase contrast image $\phi_{TIE}$ of the specimen is then produced by the formula given by the TIE phase reconstruction algorithm:

$$\phi_{TIE} = iFFT[H_{TIE}^{-1} \cdot FFT(I_{+\Delta z} - I_{-\Delta z})], \quad \text{Equation 3}$$

where $H_{TIE}(k) = k_x^2 + k_y^2$ is a second-order transfer function and FFT denotes the 2D fast Fourier transform. The simple form of the transfer function is favorable as compared to the WOTF transfer function computation, the latter of which is numerically less efficient and yield only slight improvements for high spatial frequencies. This optical transfer function $H_{TIE}(k)$—similar to $H_{DPC}(k)$—does not depend on any properties of the microscope, i.e., it is a predefined simplified transfer function only depending on the k-space position.

Different to the DPC phase contrast image, the TIE phase contrast image is not significantly affected by shadow-casting artifacts caused by out-of-focus scatterers such as impurities, dust, scratches etc., as previously explained in connection with the DPC phase reconstruction algorithm. This is because the TIE phase reconstruction algorithm does not vary the illumination configuration such that such angle-sensitive shadow-casting is removed from the pairwise difference image(s) according to the preceding Equation 3. On the other hand, high image frequencies are not preserved in the TIE phase contrast image so that edges appear blurry and the imaging resolution is reduced.

According to some examples, it is possible to execute two separate phase reconstruction algorithms, one based on the DPC subset and Equation 2 and one based on the TIE subset and Equation 3.

In such scenario, two temporary phase contrast images are obtained, calculated based on the TIE phase reconstruction algorithm and the DPC phase reconstruction algorithm, respectively. It is then possible to combine image information associated with those two temporary phase contrast images to obtain the final phase contrast image. For instance, a low-pass filter can be applied to the temporary phase contrast image obtained from the TIE phase reconstruction algorithm, while a high-pass filter can be applied to the temporary phase contrast image obtained from the DPC phase reconstruction algorithm. Then, the respective filtered representations of these temporary phase contrast images, i.e., the respective low-pass filtered and high-pass filtered image information, can be pixel-wise combined in order to obtain the final phase contrast image. Thus, given the temporary phase contrast images $\phi_{TIE}$ and $\phi_{DPC}$ according to the previous computation steps, the final HDD phase contrast image is calculated using selective high- and low-pass filters $$\phi_{HDD} = iFFT(w(k) \cdot FFT(\phi_{TIE}) + d \cdot (1 - w(k)) \cdot FFT(\phi_{DPC})), \quad \text{Equation 4}$$

where the weight function is given by a Gaussian $w(k) = \exp(-(k_x^2+k_y^2)/2\sigma^2)$. Thus, the high-pass filtered image information obtained from DPC phase contrast image is combined with the low-pass filtered image information obtained from the TIE phase contrast image. The width of the Gaussian filter kernel is controlled by the parameter $\sigma$ and chosen at least as large so as to ensure that the complementary transfer weight function, $(1-w(k))$, filters out background artefacts such as dust from the DPC temporary phase contrast image. The scalar parameter d is chosen such that continuity of the combined DPC and TIE spectra at a circular spatial frequency annulus described by $\pm \sqrt{k_x^2+k_y^2} = \sigma$ is ensured.

Using such combination of DPC end TIE phase reconstruction algorithms with subsequent combination of the TIE and DPC temporary phase contrast images enables to provide a resultant phase contrast image that has superior properties if compared to the temporary DPC and TIE phase contrast images. In particular, angle-sensitive shadow-casting due to out-of-focus scattering centers in the imaging path as present in the DPC phase contrast image are not observed in the final phase contrast image, because the high-pass filter is applied to the DPC phase contrast image. Thus, the blurry artifacts resulting from the out-of-focus scatterers in the imaging path are removed. On the other hand, the low spatial frequencies that are not well preserved by the TIE phase reconstruction algorithm are filtered out from the TIE phase contrast image, so that the respective image information is predominantly obtained from the DPC phase contrast image. Thus, the resulting HDD phase contrast image does not have similar background artifacts as the DPC phase contrast image and, at the same time, exhibits good image contrast for all spatial frequencies. Furthermore, it is sufficient to acquire a total of five different images, i.e., two images in the TIE subset at two different defocus values; and three images in the DPC subset, at three different angled illumination configurations. By only acquiring five images, or more generally less than 10 images if multiple acquisitions are performed to improve signal to noise ratio, the image acquisition time can be significantly accelerated as compared to competing approaches such as [7]. Furthermore, exposure of the specimen to light can be reduced which is favorable for certain light-sensitive specimen such as cellular structures, etc.

The acquired images and their association with the two subsets is shown below.

| Image | DPC | TIE |
|---|---|---|
| 0° off-axis illumination $\Delta z = \pm 0$ | YES | NO |
| 120° off-axis illumination $\Delta z = \pm 0$ | YES | NO |
| 240° off-axis illumination $\Delta z = \pm 0$ | YES | NO |

-continued

| Image | DPC | TIE |
|---|---|---|
| On-axis illumination $\Delta z = +c \cdot \lambda/NA^2$ | NO | YES |
| On-axis illumination $\Delta z = -c \cdot \lambda/NA^2$ | NO | YES |

TAB. 1: Two subsets for DPC and TIE based on a total of five images. The subsets are non-overlapping, i.e., there are no images that belong to both subsets. The c-parameter of the images of the TIE subset may be in the range of 1 to 10. For images used for DPC, half-circle illumination and $\sigma = \frac{1}{2}$ may be used; for images used for TIE, $\sigma \leq \frac{1}{3}$ Above, an HDD scenario has been disclosed in which two separate phase reconstruction algorithms are employed, one for obtaining the temporary DPC phase contrast image and one for obtaining the temporary TIE phase contrast image. The DPC phase contrast image and TIE phase contrast image are subsequently fused via selective high and low-pass digital signal processing. In another variant, a joint HDD reconstruction algorithm may be employed. This is illustrated below in connection with FIG. 4.

Now referring to FIG. 4: Such joint HDD reconstruction algorithm, in accordance with the disclosed techniques, combines the operating principles from DPC (cf. FIG. 2) and TIE (cf. FIG. 3).

In the illustrated example, the illumination module 91 is implemented by a PIU 201, here including an LED array including multiple LEDs positioned at different angles and distances with respect to the optical axis 207. Each of the multiple LEDs can be separately activated, e.g., by the control module 95 (cf. FIG. 1). By activating batches of LEDs—e.g., in accordance with an asymmetric pattern—different illumination patterns 202 can be formed, as previously explained in connection with FIG. 2. Each of the multiple illumination patterns 202 includes multiple activated LEDs so that a wide-angle spectrum of illumination angles is implemented; multiple illumination directions are contemporaneously activated. The asymmetric arrangement of the illumination patterns 202 results in an average of the angular spectrum inclined with respect to the optical axis 207. Note that while FIG. 4 illustrates half circle illumination patterns 202, other illumination patterns are conceivable. Furthermore, HDD is not limited to an implementation of the illumination module 91 by the PIU 201, as illustrated in FIG. 4. As a general rule, the illumination module can include at least one of a programmable LED array, a digital micromirror device, a liquid crystal display, a variable condenser aperture stop, an angular diffusor, or an aperture wheel.

For instance, a digital micromirror device can be illuminated by a light source and depending on the orientation of each mirror of the digital micromirror device, a respective illumination spot in the illumination pupil plane can be activated or deactivated—this corresponds to switching on for switching off LEDs of the programmable LED array of the programmable illumination unit 201. Thereby, it is possible to control, both, the dominant angle of the illumination (i.e., the average of the angular spectrum), as well as further properties of the angular spectrum such as width or side peaks, etc.

A similar effect can be achieved with a liquid crystal display with an appropriate backlight illumination. Individual pixels of the liquid crystal display can be activated or deactivated. A variable condenser aperture stop can include multiple apertures that can be selectively opened or closed.

An angular diffuser can help to widen the angular spectrum, by being positioned in-between the imaging plane 203 and the illumination pupil plane.

HDD is not limited to illumination configurations that include multiple illumination directions, as illustrated by the illumination patterns 202 in FIG. 4. In particular, additionally to illumination configurations that include multiple illumination directions, one or more angled illumination configurations can be used that include a single illumination direction.

In the scenario of FIG. 4 and in accordance with the HDD technique, multiple angled illumination configurations are implemented in combination with multiple defocus values 311. While in the scenario of FIG. 4 a combination of two defocus values (zero defocus and an offset by $\Delta z$) are illustrated, a larger count of defocus values would be conceivable.

Furthermore, in the scenario of FIG. 4, the multiple defocus values are implemented by shifting a sample stage to reposition the specimen along the optical path and, specifically, the optical axis 207. For instance, this can be implemented by a motorized sample stage of the optical system 92, the motorized sample stage being controlled by the control module 95 (cf. FIG. 1). This is only one option to apply the multiple defocus values. In another scenario, multiple cameras can be used, combined with beam splitters. The multiple cameras can be arranged at different distances with respect to the sample plane along the optical path. Using multiple cameras has the advantage of being able to multiplex image acquisition at multiple defocus positions. Thereby, the overall measurement time required to acquire all images that are subsequently post-processed can be reduced. Alternatively, or additionally, an electrically tunable lens can be used that has a re-configurable focal length. This enables for more compact arrangements without the need to provision multiple cameras. Electrically tunable lenses can be refocused quickly, so that the overall measurement time required to acquire the images can be reduced, e.g., if compared to a scenario in which the sample states is repositioned.

Further reduction in the measurement time can also be achieved by multiplexing the multiple angled illumination configuration in polarization space or wavelength space. For instance, a multi-color illumination module 91 (e.g., red-green-blue) can be used that is able to activate different angled illumination configurations at different wavelengths. This can then be combined with a wavelength-selective detection module 93 that is able to simultaneously acquire images at different wavelengths. Similar setups are conceivable with different polarizations.

Above, various aspects in connection with the hardware implementation of the microscope 90, as well as the various components thereof and the image acquisition measurement method have been disclosed. Next, aspects in connection with the digital postprocessing of a joint phase reconstruction algorithm will be discussed. In particular, it will be explained how a combination of multiple intensity images that are associated with different combinations of the multiple angled illumination configurations and the multiple defocus values can be implemented to thereby yield a phase contrast image.

Various aspects are based on the finding that multiple challenges must be addressed to digitally post-process the acquired HDD microscope images: (1) The typical transfer function deconvolution analysis used for DPC data, with the specimen held fixed at the focal plane, is not valid anymore. (2) The diffusion equation underlying TIE is not valid under partially coherent illumination as generated by a PIU. Moreover, the illumination patterns change, while TIE assumes a static illumination pattern. (3) Because multiple points on the PIU are switched on at the same time, the transfer function analysis as presented in [7] for individual point sources is not valid.

To solve these problems, multiple images that are acquired at different combinations of defocus values and angled illumination configurations are subtracted from each other. This enables background subtraction. Further, for each of these pairs, a difference of the respective phase transfer functions is calculated (thereby yielding a so-called differential phase transfer function). Then, based on the knowledge of the difference image and the differential phase transfer function, it is possible to reconstruct the specimen phase, e.g., using a deconvolution analysis that recovers the phase of the object with the phase imposed by the optical system.

An optimization problem can be formulated to obtain the specimen phase, i.e., the phase contrast image, based on the difference image and the differential phase transfer function. The deconvolution analysis is one option to solve such optimization problem, but other scenarios, in particular iterative approaches are conceivable. Sometimes, such iterative approaches are more robust against noise or converge more robustly.

Furthermore, there are various options available for determining the phase transfer function. One particular scenario that will be explained in detail below is based on a weak object transfer function formalism. The "weak object" assumption is used when dealing with objects that only slightly modulate the phase and amplitude of the light passing through them. The WOTF is a concept used under this weak object assumption. The WOTF includes a Fourier transform of a weak phase or amplitude object. It describes how the object influences the phase and amplitude of the light in frequency space, with the assumption that these influences are relatively small. For a weak object, the exit wave just beyond the object is approximately the sum of the incident wave plus a small perturbation due to the object itself. This WOTF formalism allows to incorporate partially coherent illumination states generated by PIUs as well as defocus under axial specimen translation. However, other options different than the WOTF formalism are available. For instance, it would be possible to use predetermined parametrized templates that are retrieved from a database and instantiated depending on the particular combination of angled illumination configuration and defocus value. Also, Hilbert transformations may be used to determine the phase transfer function.

The WOTF formalism—see [4]—provides for the following generalized transfer function (complex valued) of the optical system:

$$WOTF(k) = \int S(k') [P^*(k')P(k'+k) - P(k')P^*(k'+k)]dk', \quad \text{Equation 5}$$

where $k=(k_x, k_y)$ and $k'=(k'_x, k'_y)$ denote spatial frequencies, S is the source 92
(i.e., the illumination pattern in the illumination pupil) and P is the in-focus pupil of the optical system. Alternative formulations would be conceivable, e.g., using two-dimensional integration across the illumination angles present in the in-focus pupil.

Since the HDD phase contrast imaging utilizes both defocus and varying source patterns, two indices are required to describe changes in the illumination and defocus state of the system. The bi-modal weak object transfer is defined as follows:

$$WOTF_{m,n}(k) = \int S_m(k') [P_n^*(k')P_n(k'+k) - P_n(k')P_n^*(k'+k)]dk', \quad \text{Equation 6}$$

where the indices m and n allow for distinguishing different source patterns and defocus states, respectively. Here, $S_m(k)$ describes the $m^{th}$ illumination pattern displayed on the PIU (however, as mentioned above, this could be similarly formulated for other kinds of light module, e.g., by integrating over illumination angles that are provided by the particular light module), while defocus values can be included in this description by adding a suitable phase into the pupil. This is exemplified for a spherical phase correction below, but other phase corrections, e.g., quadratic—as an approximation—are conceivable.

$$P_n(k) = P(k)\exp\left[j \cdot z_n \cdot \sqrt{k_0^2 - k_x^2 - k_y^2}\right]. \quad \text{Equation 7}$$

Here, $z_n$ describes the relative movement of the specimen with respect to the focal plane at the $n^{th}$ axial acquisition plane.

The modulated amplitude (ATF) and phase (PTF) contrast functions are then defined as follows:

$$ATF_{m,n}(k) = \text{Real}[WOTF_{m,n}(k)] \quad \text{Equation 8}$$
$$PTF_{m,n}(k) = \text{Imag}[WOTF_{m,n}(k)].$$

For weakly absorbing specimens or aberration-free optical systems, the ATF can be neglected, see [6]. However, in some scenarios it would be possible to take into account aberrations of the optical system, e.g., spherical aberration, coma, or astigmatism to give a few examples.

Under the assumption of a zero ATF circumstances, it is possible to model the spatial two-dimensional Fourier transform of the observed image, FT[I], in a partially coherent microscope as $$FT[I_{m,n}](k) = b + PTF_{m,n}(k) \cdot FT[\phi](k), \quad \text{Equation 9}$$
$$\text{for all } m = 1, \ldots, M; n = 1, \ldots, N$$

where b is a constant offset, and φ is the unknown phase of the specimen in the imaging plane that is to be estimated. Notice that the latter is a set of equations; namely, a separate equation for every combination of source pattern (m) (or more generally angled illumination configuration) and defocus value (n).

Since the background term needs to be eliminated from these equations, we compute differences between equations with pairs of indices (m,n) and (m', n') to get $$FT\left[dI_{m,n,m',n'}\right](k) = dPTF_{m,n,m',n'}(k) \cdot FT[\phi](k), \quad \text{Equation 10}$$

where the image intensity difference (difference between microscope images as acquired, i.e., a combination of the images) has been defined as $$dI_{m,n,m',n'} = I_{m,n} - I_{m',n'} \quad \text{Equation 11}$$

and the PTF difference (differential phase contrast function)

$$dPTF_{m,n,m',n'}(k) = PTF_{m,n}(k) - dPTF_{m',n'}(k) \quad \text{Equation 12}$$

Equation 10 defines an optimization problem. This can be written as writing the latter set of equations as a least squares problem:

$$\operatorname*{argmin}_{\phi} \sum_{m,n,m',n'} \left\| FT[dI_{m,n,m',n'}](k) - dPTF_{m,n,m',n'}(k) \cdot FT[\phi](k) \right\|_2^2, \quad \text{Equation 13}$$

The optimization problem can be solved for the phase $\phi$ (i.e., to determine the phase contrast image) via numerical iterative techniques or a deconvolution. For example, the optimal phase estimate is given by $$\phi = iFT\left[\frac{\sum_{m,n,m',n'} dPTF^*_{m,n,m',n'} \cdot FT[dI_{m,n,m',n'}]}{\sum_{m,n,m',n'} |dPTF_{m,n,m',n'}|^2}\right], \quad \text{Equation 14}$$

where iFT[ . . . ] denotes Fourier transformation and we omitted the dependency of $dPTF^*_{m,n,m',n'}$ and $FT[dI_{m,n,m',n'}]$ on the spatial frequency vector k for notational simplicity. This corresponds to a Wiener filter.

The robustness of the reconstruction can be increased when modeling known aberrations in the PTF and/or ATF.

The main challenge in performing the deconvolution in the last equation is the term in the denominator $$d(k) = \sum_{m,n,m',n'} |dPTF_{m,n,m',n'}(k)|^2,$$

which can principally have zero crossings. Dividing by values close to or equal to zero leads to noise amplification or numerical problems. To prevent division by zero, a regularization term ($\alpha>0$) is added to the denominator, $$\phi = iFT\left[\frac{\sum_{m,n,m',n'} dPTF^*_{m,n,m',n'} \cdot FT[dI_{m,n,m',n'}]}{\sum_{m,n,m',n'} |dPTF_{m,n,m',n'}|^2 + \alpha}\right]. \quad \text{Equation 15}$$

If the regularization term is chosen too large, the deconvolution process will damp low spatial frequencies, resulting in a poor phase contrast and lateral resolution. Conversely, if the regularization is too low, values close to zero in the denominator lead to noise amplification. To avoid excessive regularization and therefore damping of spatial frequencies, the form of the denominator d(k) is ideally tailored such that as few regions as possible are zero.

Figure 5:
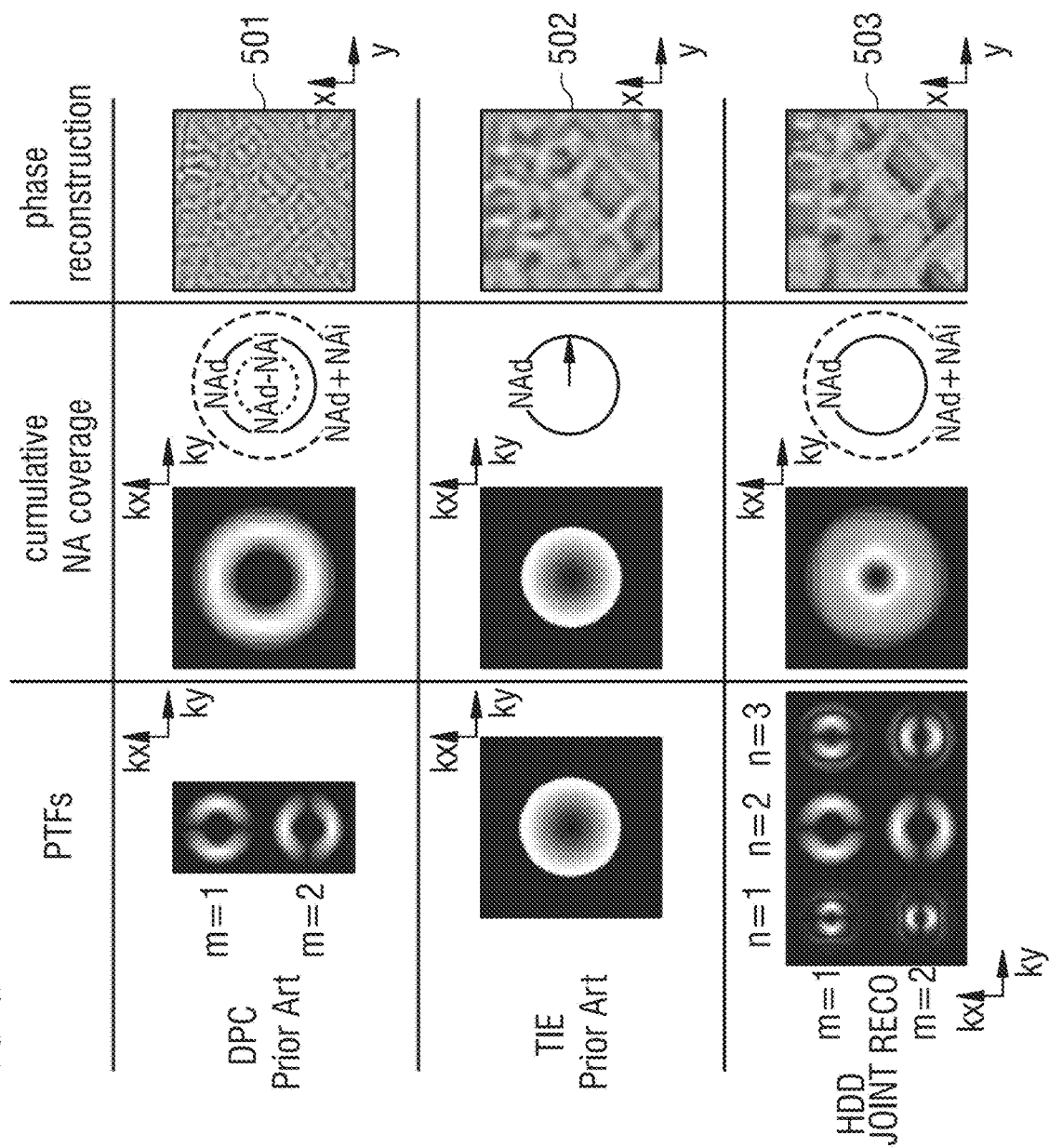
FIG. 5 is a comparison of phase transfer functions for the phase contrast techniques according to FIG. 2, FIG. 3, and FIG. 4.

FIG. 5 illustrates the PTFs for different digital phase contrast techniques—DPC, TIE and HDD—and the associated achievable numerical aperture (NA) coverage. An example phase image 501-503 is shown for each technique.

FIG. 5 illustrates the process of tailoring the spatial frequency coverage of d(k). In what follows the quantity $\sqrt{d(k)}$ is referred to as cumulative NA coverage.

FIG. 5 first row illustrates DPC (cf. FIG. 2) under unmatched illumination condition (numerical aperture of the illumination part of the optical system NAi=0.3, and numerical aperture of the detector part of the optical system NAd=0.6). While DPC is principally capable of reaching a cumulative NA radius of NAi+$NA_d$ (radius of the dashed line in the middle of the first row of FIG. 5), the center of the NA coverage exhibits a hole approximately of radius NAd−NAi, resulting in a loss of low spatial frequency coverage. This in turn causes the resulting phase reconstruction to exhibit low contrast (as apparent from the phase contrast image 501).

TIE—shown in FIG. 5, second row (cf. FIG. 3)—employs axial defocusing. When evaluating the corresponding phase transfer function (FIG. 5, second row, left column), it is seen that the NA coverage reaches lower values in k-space as compared to DPC (simply speaking, the black circle around the k-space center is smaller). This results in an improved contrast in the final phase reconstruction as compared to DPC (cf. phase contrast image 502). However, because only a single on-axis point source is used (cf. FIG. 3), standard TIE phase contrast systems have a vanishing illumination NA. Thus, the NA coverage reaches only a bandwidth of $NA_d$ (simply speaking, the white donut has a limited radius), which is a disadvantage as compared to DPC in terms of achievable lateral resolution (which is given by $\lambda/[NA_i+NA_d]$, where $\lambda$ is the wavelength). By combining, both, TIE phase reconstruction algorithm with DPC phase reconstruction algorithm using appropriate bandpass filtering (cf. Equation 4), a better NA coverage can be reached.

HDD is shown in FIG. 5, third row (cf. FIG. 4). By synthesizing the PTFs from both variable illumination patterns and defocus, a wider range of spatial frequencies can be covered (the donut in the middle column has a smaller inner hole and a wider radius). The resulting phase reconstruction (right column) features superior phase contrast as compared to DPC, while reaching a higher resolution as compared to TIE (cf. phase contrast image 503). The black regions in the PTFs require the regularization.

FIG. 6 is a flowchart of method according to various examples. The method of FIG. 6 pertains to determining a phase contrast image. This is based on the HDD technique disclosed herein. The HDD technique using digital postprocessing of multiple intensity microscope images to reconstruct the phase contrast.

The method of FIG. 6 can be implemented using a processor, based on program code that is loaded from a memory. For instance, the method of FIG. 6 can be executed by the processor 81 of the computer 80, upon loading and executing program code that is stored in the memory 83.

At optional box 605, a specimen is loaded into the microscope. For instance, a biological sample including a cell culture can be loaded into the microscope.

Loading the specimen into the microscope can include fixing a sample hold onto a sample stage of the microscope.

At optional box 610, a certain angled illumination configuration is activated. Depending on the particular implementation of the illumination module, box 610 can take different forms. For instance, it would be possible to position an aperture wheel at a certain rotational position. It would also be possible to activate a certain pattern of LEDs of an LED array of a PIU, e.g., depending on the desired angular spectrum. It would also be possible to reconfigure digital micromirrors of a DMD. Pixels of a liquid crystal display can be switched on or switched off. The angled illumination configuration that is activated at box 610 provides a whole—are illumination of the imaging plane under a certain range of illumination angles. Thus, the brightness level does not significantly vary across the imaging plane (within the aperture of the system) and the illumination angles observed at different field positions perpendicular to the optical axis also do not change.

At box 610, it is possible to activate angled illumination configurations of multiple types. The multiple types can be characterized by different widths of the respective angular spectrum. For example, a first type of angled illumination configurations that can be activated at box 610 includes a range of illumination directions. The angular spectrum is, accordingly, relatively wide. A second type of angled illumination configurations that can be activated at box 610 includes a single illumination direction. The angular spectrum is, accordingly, relatively narrow. This is illustrated in FIG. 7. FIG. 7 illustrates multiple angular spectra 701, 702, 711-714. The angular spectra illustrate the distribution of angles under which light is incident across the image plane (cf. inset in FIG. 7 where light 762 is incident in the image plane 761 and the respective angles 763 is highlighted).

FIG. 7 illustrates that the angular spectra 701, 702 include a range of illumination directions. Here, "range of illumination directions means that the illumination module that is used would be capable of providing illumination using a smaller angular spectrum; however, the illumination module is controlled to illuminate the imaging plane using a wider angular spectrum, i.e., by combining multiple illumination directions that can be individually switched by the illumination module.

For instance, for a scenario of an LED array, this means that multiple LEDs (each LED defining a single illumination direction) are contemporaneously switched on.

Differently, each of the angular spectra 711-714 includes a single illumination direction. Still the respective angular spectra 711-714 have a certain width 751—that is significantly smaller than the width 752 of the angular spectra 701, 702. This finite width 751 is due to the extension of the minimum light aperture of the light module in the illumination pupil plane, e.g., the emitter area of the light emitting diodes or the size of the pixels of a liquid crystal display or the extension of the micromirrors of a micromirror device. The hardware of the light module does not allow to provide illumination configurations having a narrower width than the angular spectra 711-714; thus, these can be referred to include single illumination directions.

FIG. 7, bottom illustrates illumination patterns 202 of a programmable light source (LED array) for the angular spectra 701, 702, 711-714 (the optical axis 207 is shown as an open circle in each of these plots).

As will be appreciated, the illumination configuration is associated with the angular spectra 701, 702 correspond to DPC-type illumination; while the illumination configuration is associated with the angular spectra 711-714 correspond to TIE-type illumination. Such techniques are based on the finding that illumination configurations providing a range of illumination directions on the one hand and illumination configurations providing a single illumination direction (or more generally broad and narrow angular spectra) have different advantages and disadvantages: Broad angular spectra provide for a high resolution in the phase contrast image. Narrow angular spectra provide for a high contrast in the phase contrast image. By combining broad and narrow angular spectra, high contrast and high resolution can be combined.

At optional box 615, one or more elements of the microscope are controlled in order to activate a certain defocus value. For instance, box 615 may include repositioning a sample stage for holding the specimen along with the optical path or optical axis. I.e., a z-repositioning can be implemented. However, it is not required in all scenarios to activate a certain defocus value. In some scenarios, it would be possible that multiple cameras are acquiring images of the imaging plane at different offsets with respect to the imaging plane; thereby implementing different defocus values. A further option would be to use an electrically configurable lens, e.g., an objective or tube lens, to implement a certain defocus value at box 615.

Then, at box 620, an image is acquired. This image is acquired at a certain combination of angled illumination configuration and defocus value according to the previous instances of execution of box 610 and box 615. It is generally noted that in some scenarios image reconstruction (explained later in connection with box 635) can be executed on pre-acquired images so that box 620 is also optional. An example sequence of images that are acquired has been disclosed above in connection with TAB. 1.

At box 625, it is checked whether a further defocus value is required; in the affirmative, a further iteration 626 of boxes 615 and 620 is performed, selecting another defocus value. This corresponds to incrementing the index n in the equations presented above.

If for a certain angled illumination configuration all defocus values have been acquired, the method commences at box 630. Here, the index n is re-initialized and subsequently at box 630 it is checked whether a further angled illumination configuration is required. In the affirmative, a further iteration 631 of boxes 610, 615, 620, 625 is executed. Also, the index m in the equations above is incremented.

It is noted that while in the scenario FIG. 6 the loop 626 is an inner loop and the loop 631 is an outer loop, also other scenarios of toggling between different defocus values and angled illumination configurations are conceivable.

Once all images have been acquired at box 620 (i.e., all different combinations of index m and index n), image reconstruction commences at box 635.

Multiple options are available for implementing box 635. In one example (box 636), a joint phase reconstruction includes images acquired at different illumination configurations as well as at different defocus values. This includes solving an optimization problem, e.g., using a deconvolution analysis as explained above. An example optimization problem has been disclosed above in connection with Equation 14 and FIG. 4. Optional regularization can be considered. In another example (box 637), separate phase reconstruction algorithms are executed for respective subsets of images, i.e., a TIE subset and a DPC subset (as previously disclosed in connection with FIG. 2 and FIG. 3). Then, a downstream combination of the TIE phase contrast image and the DPC phase contrast image can be executed to obtain the final phase contrast image.

Then, once the phase contrast image has been determined, at box 640 it is optionally possible to output the phase-contrast image to a user, e.g., via a computer screen or by uploading the image to a server.

Summarizing, at least the following EXAMPLES have been disclosed.

EXAMPLE 1. A method of determining a phase contrast image based on multiple microscope images acquired using a microscope, the microscope comprising an illumination module configured for proving a switchable angled illumination of an imaging plane of the microscope, the microscope further comprising an optical system to illuminate the imaging plane and image the imaging plane onto at least one camera of the microscope,
wherein the method comprises:
controlling the illumination module to activate multiple angled illumination configurations, at least one of the multiple angled illumination configurations comprising a respective range of illumination directions,
controlling the at least one camera to acquire multiple images at the multiple angled illumination configurations and at multiple defocus values, and
combining the multiple images to determine a phase contrast image.

EXAMPLE 2. The method of EXAMPLE 1, further comprising:
applying the multiple defocus values by at least one of shifting a sample stage along an optical path of the optical system, by using multiple cameras arranged along the optical path of the optical system, or by controlling an electrically tunable lens.

EXAMPLE 3. The method of EXAMPLE 1 or 2,
wherein at least some of the multiple angled illumination configurations are multiplexed in polarization space or wavelength space.

EXAMPLE 4. The method of any one of the preceding EXAMPLEs,
wherein the illumination module comprises at least one of a programmable LED array, a digital micromirror device, a liquid crystal display, a variable condenser aperture stop, an angular diffusor, or an aperture wheel.

EXAMPLE 5. The method of any one of the preceding EXAMPLEs,
wherein said combining of the multiple images comprises calculating pairwise differences between each of the multiple images included in a first subset using a first phase reconstruction algorithm, to thereby obtain a first temporary phase contrast image,
wherein said combining of the multiple images further comprises calculating pairwise differences between each of the multiple images included in a second subset using a second phase reconstruction algorithm, to thereby obtain a second temporary phase contrast image,
wherein the method further comprises:
combining first image information associated with the first temporary phase contrast image and second image information associated with the second temporary phase contrast image, to thereby obtain the phase contrast image.

EXAMPLE 6. The method of EXAMPLE 5, further comprising:
applying a low-pass filter to the first temporary phase contrast image, to thereby obtain the first image information, and
applying a high-pass filter to the second temporary phase contrast image, to thereby obtain the second image information.

EXAMPLE 7. The method of EXAMPLE 5 or 6,
wherein the first subset consists of a first image of the multiple images and a second image of the multiple images,
the first image included in the first subset being at a positive defocus value,
the second image included in the second subset being at a negative defocus value,
the first image and the second image included in the first subset both being acquired at the same angled illumination configuration.

EXAMPLE 8. The method of any one of EXAMPLEs 5 to 7,
wherein the second subset consists of a first image of the multiple images, a second image of the multiple images, and a third image of the multiple images,
the first image included in the second subset, the second image included in the second subset, and the third image included in the second subset all being acquired at the same defocus value and at different angled illumination configurations.

EXAMPLE 9. The method of any one of EXAMPLEs 5 to 8,
wherein at least one of the first phase reconstruction algorithm or the second phase reconstruction algorithm is based on a respective predefined optical transfer function that does not depend on properties of the microscope.

EXAMPLE 10. The method of any one of EXAMPLEs 1 to 4,
wherein said combining of the multiple images comprises solving an optimization problem that depends on differences between pairs of the multiple images and that further depends on associated differences of respective phase transfer functions, the phase transfer functions being determined for each combination of the multiple angled illumination configurations and the multiple defocus values.

EXAMPLE 11. The method of EXAMPLE 10, further comprising:
determining the phase transfer function for each combination of the multiple angled illumination configurations and the multiple defocus values based on parameterized templates stored in a database.

EXAMPLE 12. The method of EXAMPLE 11, further comprising:
calculating the phase transfer functions for each combination of the multiple angled illumination configuration and the multiple defocus values based on a weak object transfer function formalism comprising two-dimensional integrals across a light field at a pupil plane and a source plane.

EXAMPLE 13. The method of EXAMPLE 12,
wherein the weak transfer function formalism takes into account one or more aberrations of the optics.

EXAMPLE 14. The method of any one of EXAMPLEs 10 to 13,
wherein the optimization problem is solved using a deconvolution analysis.

EXAMPLE 15. The method of EXAMPLE 14,
wherein the deconvolution analysis considered a regularization term.

EXAMPLE 16. The method of any one of the preceding EXAMPLEs,
wherein at least one further of the multiple angled illumination configurations comprises a single illumination direction.

EXAMPLE 17. The method of any one of the preceding EXAMPLEs,
wherein the multiple angled illumination configurations have angular spectrum of multiple widths.

EXAMPLE 18. The method of any one of the preceding EXAMPLEs,
wherein a magnitude of each of the multiple defocus values relates to a depth of field of a detector optics of the microscope by a factor that is in the range of 1 to 10.

EXAMPLE 19. A method of determining a phase contrast image based on multiple microscope images acquired using a microscope, the microscope comprising an illumination module configured for proving a switchable angled illumination of an imaging plane of the microscope, the microscope further comprising an optical system to illuminate the imaging plane and image the imaging plane onto at least one camera of the microscope,
wherein the method comprises:
controlling the illumination module to activate multiple angled illumination configurations, the multiple angled illumination configurations having angular spectra of multiple widths,
controlling the at least one camera to acquire multiple images at the multiple angled illumination configurations and at multiple defocus values, and
combining the multiple images to determine a phase contrast image.

EXAMPLE 20. At least one processing device comprising a memory storing program code and a processor configured to load the program code and execute the program code, the processor, upon executing the program code, being configured to execute the method of any one of EXAMPLEs 1 to 19.

EXAMPLE 21. Program code that is executable by a processor, the processor, upon executing the program code, being configured to execute the method of any one of EXAMPLEs 1 to 19.

Although the invention has been shown and described with respect to certain preferred embodiments, equivalents and modifications will occur to others skilled in the art upon the reading and understanding of the specification. The present invention includes all such equivalents and modifications and is limited only by the scope of the appended claims.

For illustration, above, scenarios have been described in which the multiple angled illumination configurations include at least one angled illumination configuration that includes multiple illumination directions. More generally, it would be possible that the multiple angled illumination configurations that are used in combination with the multiple defocus values have angular spectra that have different widths, e.g., wide and narrow angular spectra (cf. FIG. 6).

Annex

In connection with Equation 2, $H_{DPC}(k)=\exp(j\cdot\arctan(k_y/k_x))$ has been used as Hilbert transformation Kernel. This equation is motivated below.

First, consider a one-dimensional DPC. The raw images (e.g., left part of LED array as well as right part of LED array) have the appearance of like DIC images. The DIC or DPC phase contrast images are related to the gradient of the phase. By subtracting the images from left and right half illumination, the gradient dphase/dx is approximately obtained. In the Fourier domain this equivalent to multiplying by jk . . . that is $$FT(d\text{phase}/dx) = j \cdot k \cdot FT(\text{phase})$$

An approximation can be done and the essential feature is that the pre-multiplier k changes sign at the origin of the coordinate system. This is the main feature of the transfer function. So, approximately:

$$FT(d\text{phase}/dx) = \text{sign}(k) \cdot FT(\text{phase})$$

Next, in two dimensions:

$$FT\left(\frac{d\text{phase}}{dx} + \frac{j\, d\text{phase}}{dy}\right) \approx$$
$$(\text{sign}(k_x) + j \cdot \text{sign}(k_y)) \cdot FT(\text{phase}) \approx$$
$$\exp(j\arctan(\phi)) \cdot FT(\text{phase})$$

where $\phi$ is the polar angle in the $k_x$, $k_y$ plane. Summarizing, the arctan is operationally taking over the role of the sign change which the rigorous transfer function does.

LIST OF REFERENCES

[1] Zernike, Frits. "Phase contrast, a new method for the microscopic observation of transparent objects part II." Physica 9.10 (1942): 974-986.
[2] Gabor, Dennis. "Microscopy by reconstructed wavefronts." Proceedings of the Royal Society of London. Series A. Mathematical and Physical Sciences 197.1051 (1949): 454-487.
[3] Nomarski, Georges. "Microinterféromètre différentiel à ondes polarisées." J. Phys. Rad. 16 (1955): 9S-13S.
[4] Streibl, Norbert. "Phase imaging by the transport equation of intensity." Optics communications 49.1 (1984): 6-10.
[5] Mehta, Shalin B., and Colin J R Sheppard. "Quantitative phase-gradient imaging at high resolution with asymmetric illumination-based differential phase contrast." Optics letters 34.13 (2009): 1924-1926.
[6] Tian, Lei, and Laura Waller. "Quantitative differential phase contrast imaging in an LED array microscope." Optics express 23.9 (2015): 11394-11403.
[7] Zhou, Shun, et al. "Transport-of-intensity Fourier ptychographic diffraction tomography: defying the matched illumination condition." Optica 9.12 (2022): 1362-1373.
[8] Amplitude filter rings according to PCT/EP2020/050307 (10 2019 100 419.5)

The invention claimed is:
1. A method of determining a phase contrast image based on multiple microscope images acquired using a microscope, the microscope comprising an illumination module configured for proving a switchable angled illumination of an imaging plane of the microscope, the microscope further comprising an optical system to illuminate the imaging plane and image the imaging plane onto at least one camera of the microscope,
wherein the method comprises:
controlling the illumination module to activate multiple angled illumination configurations, at least one of the multiple angled illumination configurations comprising a respective range of illumination directions, controlling the at least one camera to acquire multiple images at the multiple angled illumination configurations and at multiple defocus values, combining the multiple images to determine a phase contrast image, wherein said combining of the multiple images comprises calculating pairwise differences between each of the multiple images included in a first subset using a first phase reconstruction algorithm, to thereby obtain a first temporary phase contrast image, wherein said combining of the multiple images further comprises calculating pairwise differences between each of the multiple images included in a second subset using a second phase reconstruction algorithm, to thereby obtain a second temporary phase contrast image, and combining first image information associated with the first temporary phase contrast image and second image information associated with the second temporary phase contrast image, to thereby obtain the phase contrast image.

2. The method of claim 1, further comprising:
applying the multiple defocus values by at least one of shifting a sample stage along an optical path of the optical system, by using multiple cameras arranged along the optical path of the optical system, or by controlling an electrically tunable lens.

3. The method of claim 1,
wherein at least some of the multiple angled illumination configurations are multiplexed in polarization space or wavelength space.

4. The method of claim 1,
wherein the illumination module comprises at least one of a programmable LED array, a digital micromirror device, a liquid crystal display, a variable condenser aperture stop, an angular diffusor, or an aperture wheel.

5. The method of claim 1, further comprising:
applying a low-pass filter to the first temporary phase contrast image, to thereby obtain the first image information, and
applying a high-pass filter to the second temporary phase contrast image, to thereby obtain the second image information.

6. The method of claim 1,
wherein the first subset consists of a first image of the multiple images and a second image of the multiple images,
the first image included in the first subset being at a positive defocus value,
the second image included in the second subset being at a negative defocus value,
the first image and the second image included in the first subset both being acquired at the same angled illumination configuration.

7. The method of claim 1,
wherein the second subset consists of a first image of the multiple images, a second image of the multiple images, and a third image of the multiple images,
the first image included in the second subset, the second image included in the second subset, and the third image included in the second subset all being acquired at the same defocus value and at different angled illumination configurations.

8. The method of claim 1,
wherein at least one of the first phase reconstruction algorithm or the second phase reconstruction algorithm is based on a respective predefined optical transfer function that does not depend on properties of the microscope.

9. The method of claim 1,
wherein at least one further of the multiple angled illumination configurations comprises a single illumination direction.

10. The method of claim 1,
wherein the multiple angled illumination configurations have angular spectrum of multiple widths.

11. The method of claim 1,
wherein a magnitude of each of the multiple defocus values relates to a depth of field of a detector optics of the microscope by a factor that is in the range of 1 to 10.

12. A method of determining a phase contrast image based on multiple microscope images acquired using a microscope, the microscope comprising an illumination module configured for proving a switchable angled illumination of an imaging plane of the microscope, the microscope further comprising an optical system to illuminate the imaging plane and image the imaging plane onto at least one camera of the microscope, wherein the method comprises:
controlling the illumination module to activate multiple angled illumination configurations, the multiple angled illumination configurations having angular spectra of multiple widths, controlling the at least one camera to acquire multiple images at the multiple angled illumination configurations and at multiple defocus values, and combining the multiple images to determine a phase contrast image, wherein said combining of the multiple images comprises calculating pairwise differences between each of the multiple images included in a first subset using a first phase reconstruction algorithm, to thereby obtain a first temporary phase contrast image, wherein said combining of the multiple images further comprises calculating pairwise differences between each of the multiple images included in a second subset using a second phase reconstruction algorithm, to thereby obtain a second temporary phase contrast image, and combining first image information associated with the first temporary phase contrast image and second image information associated with the second temporary phase contrast image, to thereby obtain the phase contrast image.

13. At least one processing device for determining a phase contrast image based on multiple microscope images acquired using a microscope, the microscope comprising an illumination module configured for proving a switchable angled illumination of an imaging plane of the microscope, the microscope further comprising an optical system to illuminate the imaging plane and image the imaging plane onto at least one camera of the microscope, wherein the at least one processing device comprises a memory storing program code and a processor configured to load the program code and execute the program code, the processor, upon executing the program code, being configured to:
control the illumination module to activate multiple angled illumination configurations, at least one of the multiple angled illumination configurations comprising a respective range of illumination directions, control the at least one camera to acquire multiple images at the multiple angled illumination configurations and at multiple defocus values, and combine the multiple images to determine a phase contrast image, wherein said combining of the multiple images comprises calculating pairwise differences between each of the multiple images included in a first subset using a first phase reconstruction algorithm, to thereby obtain a first temporary phase contrast image, wherein said combining of the multiple images further comprises calculating pairwise differences between each of the multiple images included in a second subset using a second phase reconstruction algorithm, to thereby obtain a second temporary phase contrast image, and combine first image information associated with the first temporary phase contrast image and second image information associated with the second temporary phase contrast image, to thereby obtain the phase contrast image.

14. A system, comprising:
the at least one processing device of claim 13, and
the microscope.

15. The at least one processing device of claim 13, wherein the processor, upon executing the program code, being further configured to:
apply the multiple defocus values by at least one of shifting a sample stage along an optical path of the optical system, by using multiple cameras arranged along the optical path of the optical system, or by controlling an electrically tunable lens.

16. The at least one processing device of claim 13, wherein at least some of the multiple angled illumination configurations are multiplexed in polarization space or wavelength space.

17. The at least one processing device of claim 13, wherein the illumination module comprises at least one of a programmable LED array, a digital micromirror device, a liquid crystal display, a variable condenser aperture stop, an angular diffusor, or an aperture wheel.

18. The at least one processing device of claim 13, wherein the processor, upon executing the program code, being further configured to:
apply a low-pass filter to the first temporary phase contrast image, to thereby obtain the first image information, and
apply a high-pass filter to the second temporary phase contrast image, to thereby obtain the second image information.

19. The at least one processing device of claim 13, wherein the second subset consists of a first image of the multiple images, a second image of the multiple images, and a third image of the multiple images,
the first image included in the second subset, the second image included in the second subset, and the third image included in the second subset all being acquired at the same defocus value and at different angled illumination configurations.

20. The at least one processing device of claim 13, wherein at least one of the first phase reconstruction algorithm or the second phase reconstruction algorithm is based on a respective predefined optical transfer function that does not depend on properties of the microscope.

* * * * *